(12) United States Patent
Park (10) Patent No.: US 9,568,899 B2
(45) Date of Patent: Feb. 14, 2017

(54) APPARATUS AND METHOD FOR AUTOMATICALLY CONFIGURING SENSOR TO CONFIGURE BUILDING ENERGY MANAGEMENT SYSTEM

(71) Applicant: Electronics and Telecommunications Research Institute, Daejeon (KR)

(72) Inventor: Wan Ki Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1030 days.

(21) Appl. No.: 13/774,131

(22) Filed: Feb. 22, 2013

(65) Prior Publication Data

US 2013/0226353 A1    Aug. 29, 2013

(30) Foreign Application Priority Data

Feb. 23, 2012 (KR) .................. 10-2012-0018478

(51) Int. Cl.
*G06F 17/50*     (2006.01)
*G05B 15/02*     (2006.01)

(52) U.S. Cl.
CPC ....... *G05B 15/02* (2013.01); *G05B 2219/2642* (2013.01)

(58) Field of Classification Search
None
See application file for complete search history.

(56) References Cited

U.S. PATENT DOCUMENTS

| 8,265,870 B1* | 9/2012 | Nguyen | G01V 1/24 701/450 |
| 8,843,238 B2* | 9/2014 | Wenzel | F24F 11/006 236/44 C |
| 2004/0158359 A1* | 8/2004 | Frecska | G05B 15/02 700/276 |
| 2011/0057929 A1* | 3/2011 | Chen | G06T 7/0006 345/419 |

FOREIGN PATENT DOCUMENTS

| KR | 10-2009-0066107 | 6/2009 |
| KR | 1020110066527 | 6/2011 |
| KR | 10-2011-0110919 | 10/2011 |

OTHER PUBLICATIONS

Lertlakkhanakul et al., Developing a Building Energy Management Framework Based on Ubiquitous Sensor Networks, 2010, SAGE Publications, pp. 192-201.*
Guestrin et al., Near-Optimal Sensor Placements in Gaussian Processes, 2005, Carnegie Mellon University, pp. 1-8.*

* cited by examiner

*Primary Examiner* — Omar Fernandez Rivas
*Assistant Examiner* — Bernard E Cothran
(74) *Attorney, Agent, or Firm* — Nelson Mullins Riley & Scarborough LLP; Anthony A. Laurentano

(57) ABSTRACT

Disclosed is an apparatus and method for automatically configuring a sensor to configure a building energy management system (BEMS). The apparatus may include an information input unit to receive input of information on a building in which a BEMS is to be built, information on a sensor used to build the BEMS, and information on a budget allocated to build the BEMS, a sensor disposition unit to calculate a position for the sensor to be disposed in the building based on the input information on the building, the sensor and the allocated budget, and a user interface unit to display the disposed position for the sensor.

12 Claims, 5 Drawing Sheets

APPARATUS AND METHOD FOR AUTOMATICALLY CONFIGURING SENSOR TO CONFIGURE BUILDING ENERGY MANAGEMENT SYSTEM

CROSS-REFERENCE TO RELATED APPLICATION

This application claims the priority benefit of Korean Patent Application No. 10-2012-0018478, filed on Feb. 23, 2012, in the Korean Intellectual Property Office, the disclosure of which is incorporated herein by reference.

BACKGROUND

1. Field of the Invention

The present invention relates to an apparatus and method for automatically configuring a sensor to configure a building energy management system, that are capable of automatically calculating a position for a sensor to be disposed in a building environment to build a building energy management system efficiently managing energy usage in a building.

2. Description of the Related Art

Conventionally, when energy and environmental sensors are disposed to build a building energy management system (BEMS) in order to efficiently manage energy used in a building, workers verify positions at which the sensors are to be disposed using the naked eye, and practical experience in the installation of the sensors. Similarly, disposition of sensors to configure a sensor network is carried out by a method in which only a network is considered as disposition conditions, in view of only characteristics of wireless network signals for configuring a sensor network.

A BEMS manages energy in consideration environments of spaces in a building, such as various environmental factors including temperature, humidity, residents, air quality, illumination intensity, carbon dioxide ($CO_2$) concentration, and fine dust concentration of each space in order to provide detailed energy management functions. However, since installation of environmental sensors to configure an environment for building energy management is substantially connected with a budget for building a BEMS, instead of installing a large number of sensors without any plan, it is necessary to dispose a proper quantity of sensors in consideration of spaces in the building and a budget.

Thus, there is a demand for a method of disposing sensors in view of characteristics of a building and a sensor and a budget in disposing sensors to establish a BEMS.

SUMMARY

An aspect of the present invention provides an apparatus and a method for automatically configuring a sensor to configure a building energy management system (BEMS) that are capable of automatically disposing an environmental sensor to identify energy and environmental information in a building environment in consideration of spatial characteristics of a building, characteristics of the sensor, and a budget for sensor disposition in configuring a BEMS to efficiently use energy in the building environment.

According to an aspect of the present invention, there is provided an apparatus for automatically configuring a sensor, the apparatus including an information input unit to receive input of information on a building in which a building energy management system (BEMS) is to be built, information on a sensor used to build the BEMS and information on a budget allocated for building the BEMS, a sensor disposition unit to calculate a position at which a sensor is to be disposed in the building based on the input information on the building, the sensor and the allocated budget, and an user interface unit to display the disposed position for the sensor.

The information input unit may include a building information input module to receive an input of information on a structure and characteristics of each floor/space of the building, a vulnerability information and special requirement input module to receive input of vulnerability information on the building and a special user requirement, a budget information input module to receive input of the information on a predetermined allocated budget, a sensor characteristic information input module to receive input of information on characteristics and a standard of the sensor, and a sensor disposition knowledge input module to receive input of information on disposition knowledge of the sensor for selecting the disposed position for the sensor.

The apparatus may further include an information storage unit to store the input information on the building, the sensor, and the allocated budget.

The information storage unit may include a building information storage module to store information on a structure and characteristics of each floor/space of the building, a sensor characteristic storage unit to store information on a characteristic and a standard of the sensor, a sensor disposition knowledge storage module to store information on disposition knowledge of the sensor for selecting the position at which the sensor is to be disposed, a budgeted sensor disposition result storage module store a sensor disposition result based on the information on the allocated budget, and an entire region sensor disposed position storage module to store information on a sensor disposed position covering an entire region of the building.

The sensor disposition unit may determine the disposed position for the sensor using at least one of disposition interval information by each sensor and a signal range of each sensor based on the stored disposition knowledge of the sensor.

The sensor disposition unit may determine a position at which a next sensor is to be disposed in four directions on a plane based on the calculated disposed position for the sensor.

The sensor disposition unit may include an entire region sensor disposed position calculation module to calculate the position at which a sensor is to be disposed in an entire region of the building based on the input information on the building and the sensor, and a budget reflected sensor disposed position calculation module to calculate the position at which a sensor is to be disposed in the building based on the input information on the building, the sensor and the allocated budget.

The sensor disposition unit may further include a sensor disposition budget calculation module to calculate a budget necessary for disposing the sensor in a position including the entire region of the building.

The user interface unit may include a sensor disposition result display module to display the calculated position at which a sensor is to be disposed, and a sensor disposed position correction module to correct the calculated position at which a sensor is to be disposed.

According to an aspect of the present invention, there is provided a method for automatically configuring a sensor, the method including receiving input of information on a building in which a building energy management system (BEMS) is to be built, information on a sensor used to build the BEMS and information on a budget allocated for building the BEMS, calculating a position at which a sensor is to be disposed in the building based on the input information on the building, the sensor and the allocated budget, and displaying the disposed position for the sensor.

As described above, in configuring a BEMS, the apparatus and the method for automatically configuring a sensor according to the present invention may automatically determine a position at which a sensor is to be disposed in a building environment, verify the determined position of the sensor, and estimate a budget necessary for configuring the sensor in advance on a program based on information about spatial characteristics of a building, characteristics of the sensor and a budget for sensor disposition before actually installing the sensor in the building.

Further, the sensor may be repositioned based on an allocated budget, thereby preventing waste of resources and a number of errors, and verifying environmental information on the BEMS in advance.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
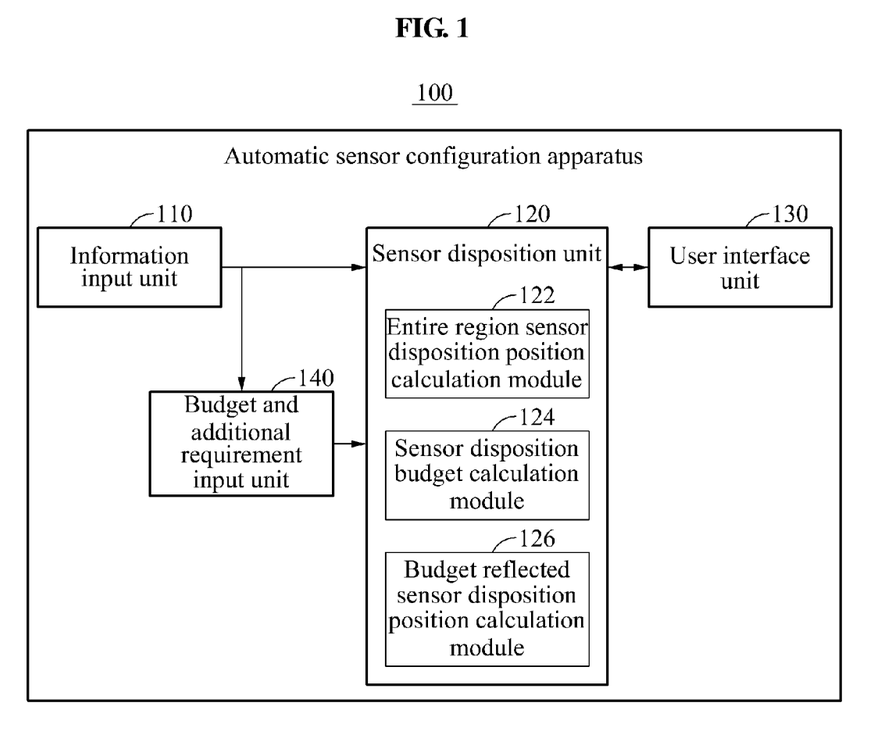
FIG. 1 is a block diagram illustrating an apparatus for automatically configuring a sensor to configure a building energy management system (BEMS) according to an embodiment of the present invention.

FIG. 1 is a block diagram illustrating an apparatus for automatically configuring a sensor to configure a building energy management system (BEMS) according to an embodiment of the present invention.

Referring to FIG. 1, the apparatus for automatically configuring the sensor 100 according to the present invention includes an information input unit 110, a sensor disposition unit 120, and a user interface unit 130, and may further include a budget and additional requirement input unit 140 to additionally receive a special requirement of a user as input information necessary to dispose a sensor as needed.

The information input unit 110 receives an input of spatial information and characteristics of a building environment in which a BEMS is to be installed, information on a budget allocated by a user, and information on sensor characteristics.

The sensor disposition unit 120 calculates a disposed position for each sensor in the building environment based on the information input through the information input unit 110 and allocates a budget necessary for disposing the sensor based on a previously disposed sensor. To this end, the sensor disposition unit 120 may include an entire region sensor disposition position calculation module 122 to calculate a position for a sensor to be disposed in an entire region of a building, a sensor disposition budget calculation module 124 to allocate a budget necessary to dispose the sensor calculated by the entire region sensor disposition position calculation module 122, and a budget reflected sensor disposition position calculation module 126 to readjust the position at which a sensor is to be disposed by the entire region sensor disposition position calculation module 122 based on a budget to be allocated for building the BEMS.

The user interface unit 130 displays a disposed position for a sensor and budget information calculated by the sensor disposition unit 120 to a user.

Figure 2:
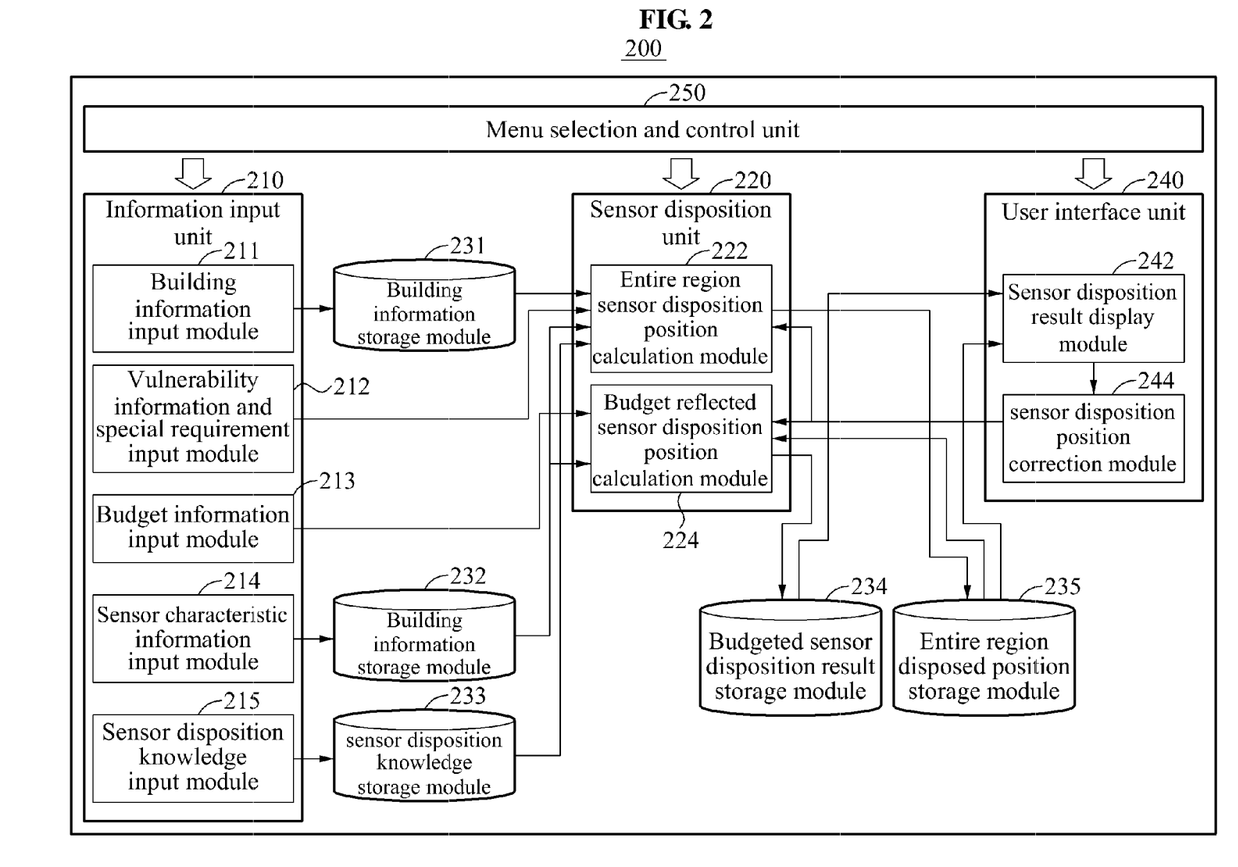
FIG. 2 is a block diagram illustrating a detailed configuration of an apparatus for automatically configuring a sensor to configure a BEMS according to an embodiment of the present invention.

FIG. 2 is a block diagram illustrating a detailed configuration of an apparatus for automatically configuring a sensor to configure a BEMS according to an embodiment of the present invention. Hereinafter, the apparatus for automatically configuring the sensor according to the present invention will be described in detail with reference to FIG. 2.

The apparatus 200 for automatically configuring the sensor includes an information input unit 210, a sensor disposition unit 220, an information storage unit, a user interface unit 240, and a menu selection and control unit 250.

The information input unit 210 receives an input of information on a building in which a BEMS is to be built, information on a sensor used to build the BEMS, and information on a budget to be allocated in building the BEMS.

To this end, the information input unit 210 may include a building information input module 211 to receive input of information on a floor structure and characteristics of the building, a structure and characteristics of each floor, and a structure and characteristics of each space, a vulnerability information and special requirement input module 212 to receive input of vulnerability information for a user in consideration of the characteristics of the building and a special user requirement, a budget information input module 213 to receive input of information on an allocated budget preset by a user, a sensor characteristic information input module 214 to receive input of information on characteristics and a standard of a sensor to be installed/disposed in the BEMS, and a sensor disposition knowledge input module 215 to receive input of information on disposition knowledge of a sensor for selecting a position at which the sensor is to be disposed to enable initial input/continuous updating.

The sensor disposition unit 220 includes an entire region sensor disposition position calculation module 222 and a budget reflected sensor disposition position calculation module 224 to calculate a position for the sensor to be disposed in the building and to allocate a budget necessary for disposing the sensor based on the information on the building, the sensor, and the allocated budget input through the information input unit 210.

The entire region sensor disposition position calculation module 222 may calculate a disposed position for the sensor in the entire region of the building based on the input information on the building and the sensor. The budget reflected sensor disposition position calculation module 224 may calculate position at which a sensor is to be disposed based on the input information on the building, the sensor, and the allocated budget.

Although not shown in FIG. 2, the sensor disposition unit 220 may further include a sensor disposition budget calculation module to allocate a budget necessary for disposing the sensor in a position including the entire region of the building calculated by the entire region sensor disposition position calculation module 222 as needed by a person skilled in the art.

For example, the sensor disposition unit 220 may determine a disposed position for the sensor using disposition interval information by each sensor and a signal range of each sensor based on the disposition knowledge of the sensor input through the information input unit 210. In this case, the sensor disposition unit 220 may determine a disposed position for each sensor in a way of determining position at which a next sensor is to be disposed in four directions on a plane based on a disposed position of a reference sensor calculated using the different types of input information.

The information storage unit stores information to calculate position at which a sensor is to be disposed, various types of information input through the information input unit 210, and information calculated by the sensor disposition unit 220. For example, the information storage unit may be configured as a database (DB) pool to manage various types of information with a plurality of separate modules. In this case, the information storage unit may include a building information storage module 231 to store information on a structure and characteristics of each floor/space of the building input through the building information input module 211, a sensor characteristic storage unit 232 to store information on characteristics and a standard of a sensor input through the sensor characteristic information input module 214, a sensor disposition knowledge storage module 233 to store information on disposition knowledge of a sensor for selecting a disposed position for the sensor input through the sensor disposition knowledge input module 215, a budgeted sensor disposition result storage module 234 to store a sensor disposition result calculated by the budget reflected sensor disposition position calculation module 224 based on information on an allocated budget input by the user through the budget information input module 213, and an entire region sensor disposed position storage module 235 to store information on a sensor disposed position covering the entire region of the building calculated by the entire region sensor disposition position calculation module 222 calculating a sensor disposed position covering the entire region for providing an entire building energy management function regardless of a budget.

The user interface unit 240 serves to display a position at which a sensor is to be disposed and budget information allocated by the sensor disposition unit 220 and to correct the disposed position of the sensor. To this end, the user interface unit 240 may include a sensor disposition result display module 242 to automatically display a disposed position for a sensor and budget information and a sensor disposition position correction module 244 to correct the disposed position of the sensor based on a displayed result.

Operations and controls of the information input unit 210, the sensor disposition unit 220, and the user interface unit 240 may be carried out overall by the menu selection and control unit 250.

Figure 3:
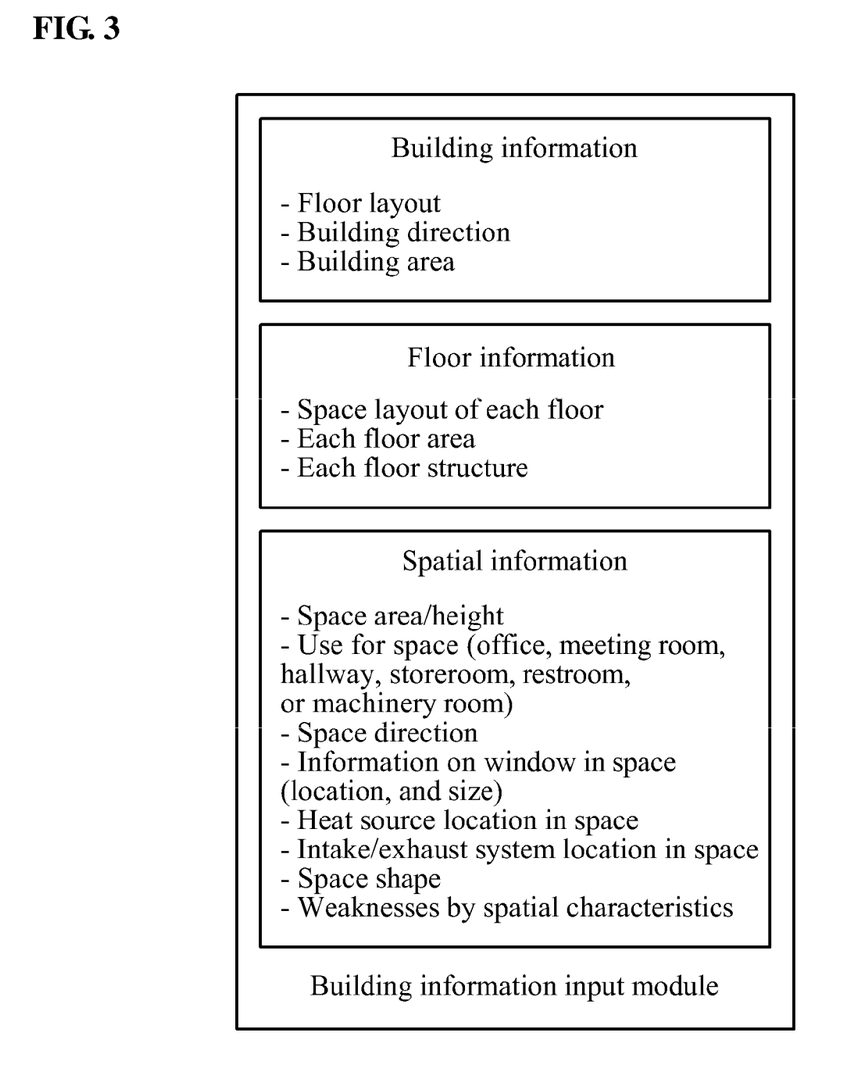
FIG. 3 illustrates detailed building information according to an embodiment of the present invention.

FIG. 3 illustrates detailed building information according to an embodiment of the present invention.

Detailed information on a building and a space among detailed information input by the information input unit may include the following detailed input elements.

The building information input module may receive building information, such as a floor layout, a direction and an orientation of a building and an area of the entire building, and floor information, such as a layout of a space of each floor, an area of each floor and a floor structure.

Further, the detailed information on the building includes spatial information, such as an area and height of each space, a use for a space, for example, an office, a meeting room, a hallway, a storeroom, a restroom or a machinery room, a direction of a space, information on a window in a space, a location and a size of the window, a location of a heat source in a space, a location of an intake/exhaust system, a space shape, and weaknesses by spatial characteristics, which are utilized as basic data for automated sensor disposition calculation.

The apparatus for automatically configuring the sensor according to the present invention may receive building information shown in FIG. 3 from a user to provide an automatic sensor disposition function. Further, the apparatus may store a type of a sensor, characteristics of a sensor, a reference for disposition of each sensor for example, a distance between sensors and a sensor signal range, and knowledge about sensor disposition using an automatic sensor disposition administrator function. Such knowledge about sensor characteristics and sensor disposition may be updated by a tool manager as necessary.

When the information on the building is completely input, the apparatus for automatically configuring the sensor may detect a location where a sensor is to be necessarily installed using vulnerability information and a special requirement input by a user since the location is considered the most vulnerable spot with respect to each sensor. For example, for a temperature sensor, such a vulnerable spot may be a location adjacent to a window, a farthest location from the window, a location adjacent to a heat source, a farthest location from the heat source, and a location adjacent to an intake/exhaust value. Then, the apparatus may first determine a position for a reference sensor based on the position calculated in this way.

Figure 4:
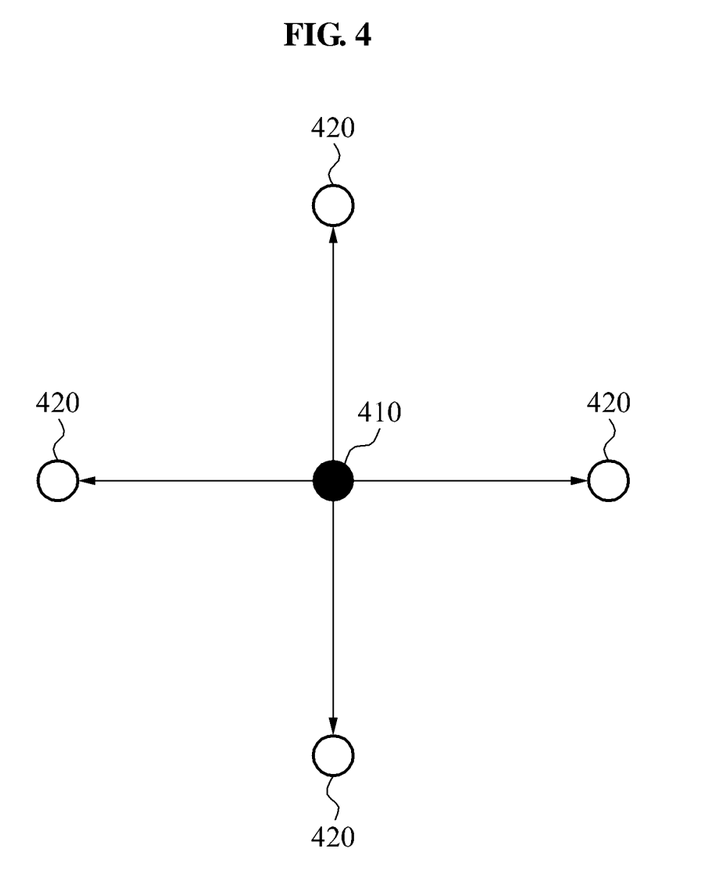
FIG. 4 illustrates a direction which a next sensor is to be positioned in according to an embodiment of the present invention.

FIG. 4 illustrates a direction which a next sensor is to be positioned in according to an embodiment of the present invention.

When the position for the reference sensor is determined, the apparatus for automatically configuring the sensor according to the present invention may calculate a position 420 for a next sensor using sensor disposition knowledge on the basis of the calculated position 410 of the reference sensor.

By way of example, the position for the next sensor may be calculated by two methods. A first method is based on information on a disposition interval between sensors stored by each sensor in the sensor disposition knowledge storage module, and a second method is based on influence of a signal range of a sensor.

For example, the first method is used for disposing temperature and humidity sensors. In these sensors, a position for a next sensor is calculated based on a distance between sensors stored in the sensor disposition knowledge storage module. The second method is used for disposing an occupancy sensor. Here, the occupancy sensor has a detectable range. Thus, a position for a next sensor may be calculated based on the range of the sensor as characteristics of the sensor.

Generally, when a position for a sensor is determined as a reference for sensor disposition, a position for a next sensor may be determined in a manner of expanding the position in four directions on a plane based on the sensor in the position as a reference sensor.

By automatically disposing a sensor in this way, it is important to build a sensor disposition knowledge storage module. The sensor disposition knowledge storage module may include a sensor disposition reference based on spatial characteristics of a building and a vulnerable spot selection and sensor disposition reference by each sensor based on building characteristics, for example, a use, a direction, a heat source, intake/exhaust locations, a window location and a lighting location.

The apparatus for automatically configuring the sensor selects the position 420 for the next sensor based on the sensor disposition knowledge storage module and determines a position for the sensor to include all regions of a required space by evaluating whether the selected position has a coordinate in a disposition space and overlap with a position of an already disposed sensor. When the disposition of the sensor is completed, the apparatus may terminate a first function with respect to automated sensor disposition, calculate budget information on sensor disposition for entire building energy management and position information on each sensor based on price information about the disposed sensor, and display the information to a user through a screen. The user may perform a function of repositioning the sensor based on a preference as to special requirements and the price information according to a sensor disposition result using the sensor disposition position correction module.

Figure 5:
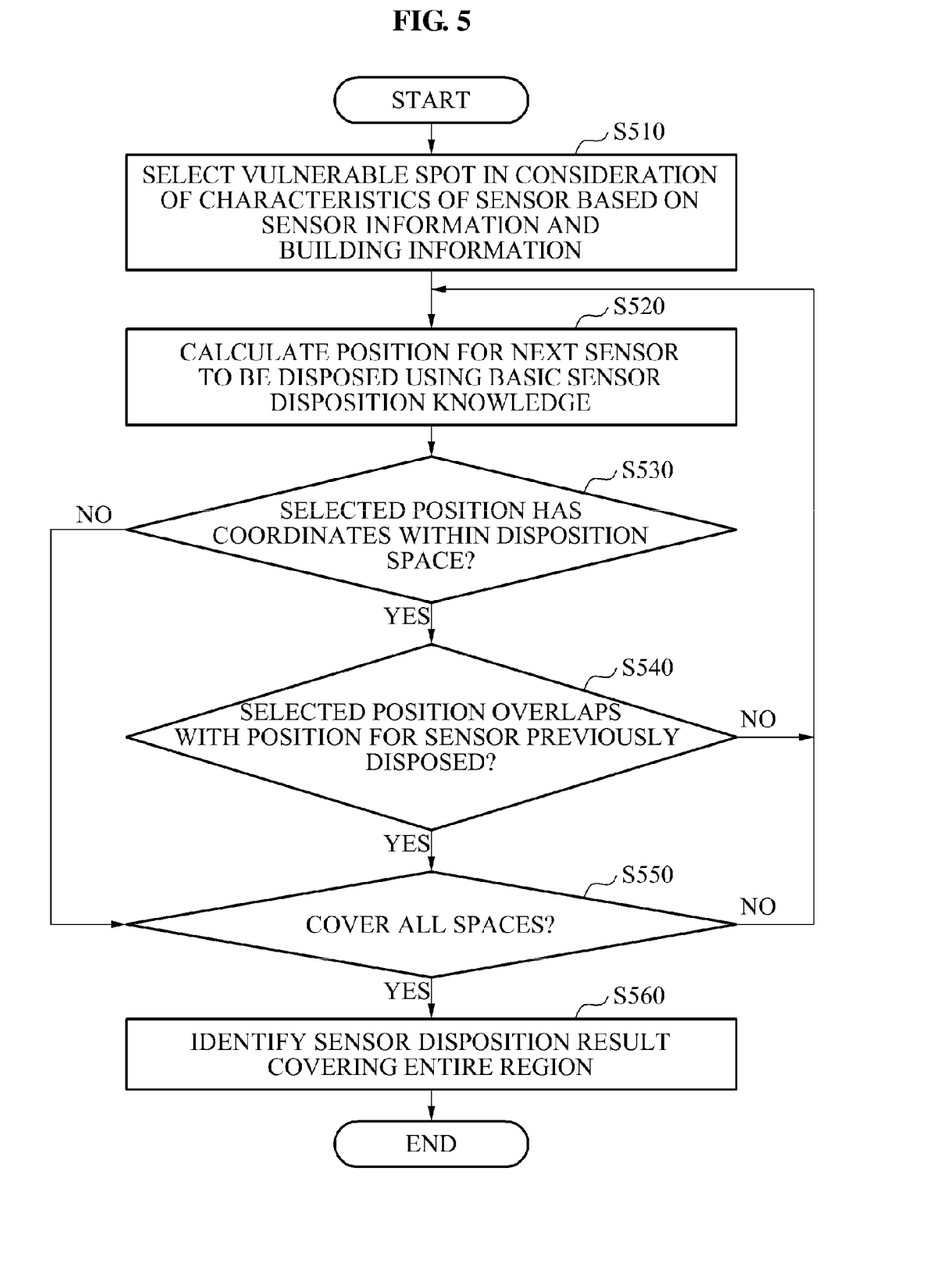
FIG. 5 is a flowchart illustrating a method for automatically configuring a sensor to configure a BEMS according to an embodiment of the present invention.

FIG. 5 is a flowchart illustrating a method for automatically configuring a sensor to configure a BEMS according to an embodiment of the present invention.

First, the apparatus for automatically configuring the sensor receives input of information on a building in which a BEMS is to be built, information on a sensor used to build the BEMS, and information on a budget to be allocated for building the BEMS. Here, the apparatus may select a vulnerable spot in consideration of characteristics of each sensor based on the sensor information and the building information in operation S510. Then, the apparatus calculates a position at which a sensor is to be disposed based on the information on the building, the sensor, and the allocated budget.

When the position for the reference sensor is calculated in this manner, the apparatus calculates a position at which a next sensor is to be disposed using basic sensor disposition knowledge in operation S520.

For example, the apparatus may select a disposed position for each sensor using at least one of disposition interval information by each sensor and a signal range of each sensor.

Here, the apparatus determines whether the position at which the sensor is to be disposed is calculated based on the information on the building is within the building in operation S530. When the position at which the sensor is to be disposed is in the building, the apparatus determines whether the position overlaps a position previously calculated in operation S540. When the position at which the sensor is to be disposed is not in the building, the apparatus determines whether the position at which the sensor is to be disposed covers the entire region of the building in operation S550.

Further, when the selected position at which the sensor is to be disposed does not overlap a previously calculated position, the apparatus continues to calculate position at which the sensor is to be disposed. When the position at which the sensor is to be disposed overlaps a a previously calculated position, the apparatus determines whether the position at which the sensor is to be disposed covers the entire region of the building and disposes the sensor to cover the entire space.

Then, when it is determined that position at which the sensor is to be disposed covers the entire region of the building in operation S560, the apparatus displays the calculated disposed position of the sensor through the user interface unit.

Thus, in configuring a BEMS, the apparatus and the method for automatically configuring a sensor to configure a BEMS according to the present invention may automatically determine a position for a sensor in a building environment, verify the determined position of the sensor, estimate a budget necessary for configuring the sensor in advance, and reposition the sensor based on an allocated budget on a program before actually installing the sensor in a building.

The above-described exemplary embodiments of the present invention may be recorded in computer-readable media including program instructions to implement various operations embodied by a computer. The media may also include, alone or in combination with the program instructions, data files, data structures, and the like. The program instructions stored in the media may be specially designed and configured for the present invention, or may be known to those skilled in the art and thereby be implemented. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for automatically configuring a reference sensor, the apparatus comprising:
    an information input unit to receive input of information on a building in which a building energy management system (BEMS) is to be built, information on a reference sensor used to build the BEMS, and information on a budget allocated for building the BEMS;
    a sensor disposition unit to calculate a position at which the reference sensor is to be disposed in the building based on the input information on the building, the reference sensor, and the allocated budget, and determine a position at which a next sensor is to be disposed in four directions on a plane based on the calculated position at which the reference sensor is to be disposed; and a user interface unit to display the position at which the reference sensor is to be disposed, wherein the sensor disposition unit comprises:

an entire region sensor disposition calculation module to calculate the position at which a sensor is to be disposed in an entire region of the building based on the input information on the building and the information on the reference sensor; and a budget reflected sensor disposition position calculation module to calculate the disposed position for the sensor in the building based on the input information on the building, the information on the reference sensor, and the information on the allocated budget.

2. The apparatus of claim 1, wherein the information input unit comprises:

a building information input module to receive input of information on a structure and characteristics of each floor/space of the building;

a vulnerability information and special requirement input module to receive input of vulnerability information on the building and a special user requirement;

a budget information input module to receive input of the information on a preset allocated budget;

a sensor characteristic information input module to receive an input of information on characteristics and a standard of the reference sensor; and a sensor disposition knowledge input module to receive an input of information on disposition knowledge of the reference sensor for selecting the position at which the sensor is to be disposed.

3. The apparatus of claim 1, further comprising an information storage unit to store the input information on the building, the information on the reference sensor, and information on the allocated budget.

4. The apparatus of claim 3, wherein the information storage unit comprises:

a building information storage module to store information on a structure and characteristics of each floor/space of the building;

a sensor characteristic storage unit to store information on a characteristic and a standard of the reference sensor;

a sensor disposition knowledge storage module to store information on disposition knowledge of the reference sensor for selecting the disposed position for the reference sensor;

a budgeted sensor disposition result storage module to store a sensor disposition result based on the information on the allocated budget; and an entire region sensor disposed position storage module to store information on a position at which a sensor is to be disposed for covering an entire region of the building.

5. The apparatus of claim 4, wherein the reference sensor disposition unit determines the position at which a sensor is to be disposed using at least one of disposition interval information by each sensor and a signal range of each sensor based on the stored disposition knowledge of the reference sensor.

6. The apparatus of claim 1, wherein the sensor disposition unit further comprises a sensor disposition budget calculation module to calculate a budget necessary for disposing the reference sensor at a position covering the entire region of the building.

7. The apparatus of claim 1, wherein the user interface unit comprises:

a sensor disposition result display module to display the calculated position at which the sensor is to be disposed; and a sensor disposition position correction module to correct the calculated position at which the reference sensor is to be disposed.

8. A method for automatically configuring a reference sensor, the method comprising:

receiving input of information on a building in which a building energy management system (BEMS) is to be built, information on a reference sensor used to build the BEMS, and information on a budget allocated for building the BEMS;

calculating a position at which the reference sensor is to be disposed in the building based on the input information on the building, the information on the reference sensor, and the allocated budget;

determining a position at which a next sensor is to be disposed in four directions on a plane based on the calculated position at which the reference sensor is to be disposed;

and displaying the position at which the reference sensor is to be disposed, wherein, the calculating the position comprises:

calculating the position at which a sensor is to be disposed in an entire region of the building based on the input information on the building and the information on the reference sensor; and calculating the disposed position for the reference sensor in the building based on the input information on the building, the information on the reference sensor, and the information on the allocated budget.

9. The method of claim 8, wherein the calculating of position at which the reference sensor is to be disposed comprises using at least one of disposition interval information by each sensor and a signal range of each sensor based on pre-stored disposition knowledge of the reference sensor for selecting the disposed position for the reference sensor.

10. The method of claim 9, further comprising:

determining whether the position at which the reference sensor is to be disposed in calculated based on information on the building is within the building after the calculating of position at which the reference sensor is to be disposed is completed.

11. The method of claim 10, further comprising:

determining whether the position at which a sensor is to be disposed overlaps a previously calculated position at which a sensor is to be disposed, after the determining whether the disposed position for the reference sensor is within the building.

12. The method of claim 10, further comprising:

determining whether the position at which the reference sensor is to be disposed covers an entire region of the building after determining whether the position at which a sensor is to be disposed overlaps a previously calculated position at which a sensor is to be disposed.

* * * * *